(No Model.)
M. T. WYATT.
PIPE REAMER.
No. 327,638. Patented Oct. 6, 1885.
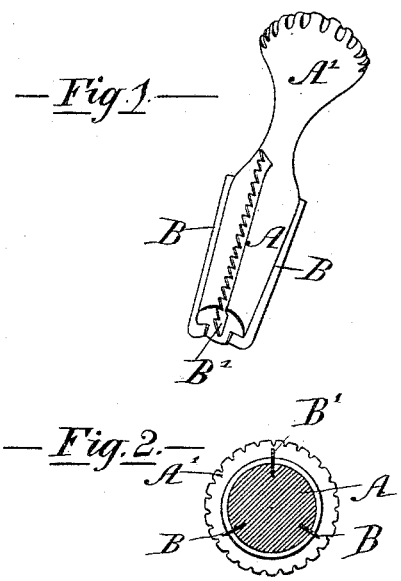
Witnesses:
Inventor:

UNITED STATES PATENT OFFICE.

MATTHEW THOMAS WYATT, OF QUEBEC, QUEBEC, ASSIGNOR OF ONE-HALF TO WILLIAM FULLARTON RAMSAY, OF MONTREAL, CANADA.

PIPE-REAMER.

SPECIFICATION forming part of Letters Patent No. 327,638, dated October 6, 1885.

Application filed September 29, 1884. Serial No. 144,188. (No model.)

*To all whom it may concern:*

Be it known that I, MATTHEW THOMAS WYATT, of the city, county, and Province of Quebec, Canada, have invented a certain new and useful Improved Pipe-Reamer; and I do hereby declare that the following is a full, clear, and exact description of the same.

This invention consists in a novel device for removing the caked or charred interior of tobacco-pipes from time to time as the same accumulates from constant use, it being composed of a handle and a tapering stock having one or more plain and one or more serrated blades projecting from and beyond it. For full comprehension, however, of my invention reference must be had to the accompanying drawings, forming part of this specification, in which—

Figure 1 is a perspective view of my pipe-reamer; and Fig. 2, a cross section of same, taken through body and blades.

Similar letters of reference indicate like parts.

A represents the body of the pipe-reamer, formed of wood, gutta-percha, or other suitable material, of the shape shown—viz., the frustum of a cone—an extension thereof (marked A') forming a handle turned or carved to any desired configuration.

B B represent blades, of steel or other hard material, held in the body A, but projecting radially therefrom at side and end, and provided with cutting or scraping edges.

B' is another blade, having a serrated or saw edge, which preferably projects a little beyond the plain blades B.

Although two plain blades and one serrated blade are shown in the drawings, I do not limit myself to this number, as there may be more than one serrated blade and a greater or less number of plain blades used, at discretion. The serrated blade scratches or cuts up the charred cake, and the pieces and dust are removed by the plain blades, leaving the bowl clean and smooth.

The usefulness of my invention will be apparent; but I may state that the reamer cannot possibly injure or cut the interior of the pipe unevenly, as is the case when an ordinary penknife is used.

It will be observed, moreover, that all the blades project a short distance beyond the end of the stock, in order that the material collected in the bottom of the bowl may be loosened and removed.

What I claim is as follows:

The herein-described tool for cleaning the bowls of tobacco-pipes, consisting of an enlarged head or handle and a tapering stock having wings or blades projecting radially from it and extending beyond the end of such stock, substantially as and for the purposes set forth.

MATTHEW THOMAS WYATT.

Witnesses:
OWEN N. EVANS,
C. P. McDOWELL.